(12) United States Patent
Sanders et al.

(10) Patent No.: US 6,706,837 B2
(45) Date of Patent: *Mar. 16, 2004

(54) ANIONIC POLYMERS COMPOSED OF DICARBOXYLIC ACIDS AND USES THEREOF

(75) Inventors: John Larry Sanders, Leawood, KS (US); Grigory Mazo, Wilmette, IL (US); Jacob Mazo, Wilmette, IL (US)

(73) Assignee: Specialty Fertilizer Products, LLC, Belton, MO (US); part interest ( * ) Notice: Subject to any disclaimer, the term of this patent is extended or adjusted under 35 U.S.C. 154(b) by 0 days.

This patent is subject to a terminal disclaimer.

(21) Appl. No.: 10/250,112

(22) Filed: Jun. 4, 2003

(65) Prior Publication Data

US 2003/0181614 A1 Sep. 25, 2003

Related U.S. Application Data

(62) Division of application No. 09/799,210, filed on Mar. 5, 2001.

(51) Int. Cl.$^7$ .............................................. C08F 222/10
(52) U.S. Cl. ...................... 526/321; 526/266; 526/269; 526/270; 526/271; 526/314; 526/318.2; 526/318.43; 526/319; 526/325; 504/361; 504/271; 71/33; 71/64.07
(58) Field of Search ................................. 526/266, 269, 526/270, 271, 314, 318.2, 318.43, 319, 321, 325; 504/361, 271; 71/33, 64.07; C08F 222/10

(56) References Cited

U.S. PATENT DOCUMENTS

| 4,044,196 | A | * | 8/1977 | Huper et al. ................. 526/271 |
| 4,559,159 | A | * | 12/1985 | Denzinger et al. ...... 252/174.24 |
| 5,656,646 | A | * | 8/1997 | Perner et al. ................ 510/361 |
| 6,033,442 | A | * | 3/2000 | Denzinger et al. ........... 8/94.33 |
| 6,515,092 | B2 | * | 2/2003 | Sander et al. ................ 526/321 |

* cited by examiner

Primary Examiner—Helen L. Pezzuto
(74) Attorney, Agent, or Firm—Hovey Williams LLP

(57) ABSTRACT

Biodegradable anionic polymers are disclosed which include recurring polymeric subunits preferably made up of dicarboxylic monomers such as maleic anhydride, itaconic anhydride or citraconic anhydride. Free radical polymerization is used in the synthesis of the polymers. The polymers may be complexed with ions and/or mixed with fertilizers or seeds to yield agriculturally useful compositions. The preferred products of the invention may be applied foliarly or to the earth adjacent growing plants in order to enhance nutrient uptake by the plants.

28 Claims, 2 Drawing Sheets

ANIONIC POLYMERS COMPOSED OF DICARBOXYLIC ACIDS AND USES THEREOF

CROSS REFERENCE TO RELATED APPLICATIONS

This is a divisional of application Ser. No. 09/799,210, filed Mar. 5, 2001, which is hereby incorporated by reference herein.

BACKGROUND OF INVENTION

1. Field of the Invention

The present invention is broadly concerned with novel substantially biodegradable and substantially water soluble anionic polymers and derivatives thereof which have significant utility in agricultural applications, especially plant nutrition and related areas. More particularly, the invention is concerned with such polymers, as well as methods of synthesis and use thereof, wherein the preferred polymers have significant levels of anionic groups. The most preferred polymers of the invention include recurring polymeric subunits made up of dicarboxylic (e.g., maleic acid or anhydride, itaconic acid or anhydride, and other derivatives thereof) monomers. The polymers may be applied directly to the ground adjacent growing plants, complexed onto ions, applied directly to seeds, and/or mixed with or coated with phosphate-based fertilizers to provide improved plant nutrition products.

2. Description of the Prior Art

Lignosulfonates, polyacrylates, polyaspartates and related compounds have become known to the art of agriculture as materials that facilitate nutrient absorption. All of them suffer from significant disadvantages, which decrease their utility in comparison to the art discussed herein and limit performance.

Lignosulfonates are a byproduct of paper pulping; they are derived from highly variable sources. They are subject to large, unpredictable variations in color, physical properties, and performance in application areas of interest for this invention.

Polyacrylates and polymers containing appreciable levels thereof can be prepared with good control over their composition and performance.

They are stable to pH variations. However, polyacrylates have just one carboxylate per repeat unit and they suffer from a very significant limitation in use, namely that they are not biodegradable. As a result, their utility for addressing the problems remedied by the instant invention is low.

Polyaspartates are biodegradable, but are very expensive, and are not stable outside a relatively small pH range of about 7 to about 10. They usually have very high color, and incorporate amide groups, which causes difficulties in formulating them. Additionally, polyaspartates have just one carboxylate per repeat unit and are therefore not a part of the present invention.

Preparation of itaconic acid homopolymers has been known to the art of polymer chemistry for an extended period of time. Several approaches to making it exist. One approach is by the direct polymerization of itaconic acid and/or its salts in aqueous or organic solutions under a wide range of conditions. Such reactions are described in the *Journal of Organic Chemistry*, Vol. 24, pg. 599 (1959) the teachings of which are incorporated by reference herein. Another approach is to begin with esters of itaconic acid, polymerize them under suitable conditions, and then hydrolyze the ester groups off in order to liberate polyitaconic acid. This approach is described in U.S. Pat. No. 3,055,873, the teachings of which are hereby incorporated by reference. Additionally, a very good summary of many aspects of the prior art is found in U.S. Pat. No. 5,223,592, the teachings of which are hereby incorporated by reference.

It will thus be seen that the prior art fails to disclose or provide polymers which can be synthesized using a variety of monomers and techniques in order to yield end products which are substantially biodegradable, substantially water soluble, and have wide applicability for agricultural uses. Moreover, no prior art or combination of prior art discloses preparation of itaconic acid copolymers with one or more organic acids containing at least one olefinic bond and at least two carboxylic acid groups. Furthermore, while the prior art does disclose a variety of methods for making polyitaconic acid homopolymer, it fails to teach, disclose, or suggest the utility such materials unexpectedly have for a wide variety of agricultural uses.

SUMMARY OF INVENTION

The present invention overcomes the problems outlined above and provides a new class of anionic polymers having a variety of uses, e.g., for enhancing takeup of nutrient by plants or for mixture with conventional phosphate-based fertilizers to provide an improved fertilizer product. Advantageously, the polymers are biodegradable, in that they degrade to environmentally innocuous compounds within a relatively short time (up to about 1 year) after being in intimate contact with soil. That is to say, the degradation products are compounds such as $CO_2$ and $H_2O$ or the degradation products are absorbed as food or nutrients by soil microorganisms and plants. Similarly, derivatives of the polymers and/or salts of the polymers (e.g. ammonium salt forms of the polymer) also degrade within a relatively short time, during which significant fractions of the weight of the polymer are believed to be metabolized by soil organisms.

Broadly speaking, the anionic polymers of the invention include recurring polymeric subunits made up of at least two different moieties individually and respectively taken from the group consisting of what have been denominated for ease of reference as B and C moieties; alternately, the polymers may be formed from recurring C moieties. Thus, exemplary polymeric subunits may be BC, CB, CC, or any other combination of B, and C moieties; moreover, in a given polymer different polymeric subunits may include different types of moieties, e.g., in an BC recurring polymeric unit polymer, the B moiety may be different in different units.

In detail, moiety B is of the general formula

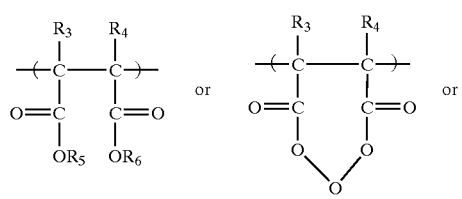 or 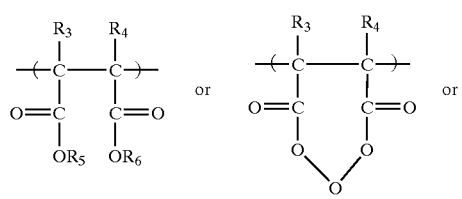 or

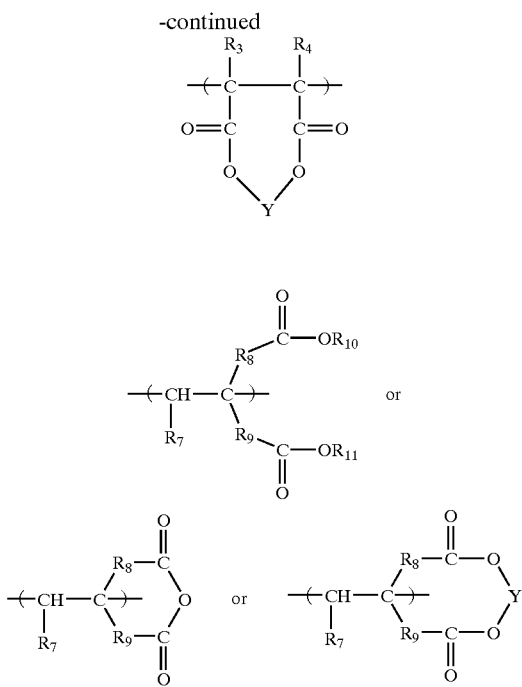

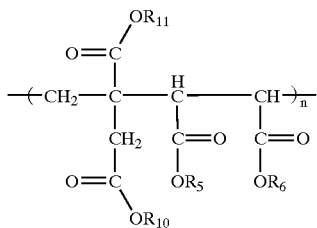

wherein each $R_7$ is individually and respectively selected from the group consisting of H, OH, $C_1$–$C_{30}$ straight, branched chain and cyclic alkyl or aryl groups, $C_1$–$C_{30}$ straight, branched chain and cyclic alkyl or aryl formate $(C_0)$, acetate $(C_1)$, propionate $(C_2)$, butyrate $(C_3)$, etc. up to $C_{30}$ based ester groups, $R'CO_2$ groups, $OR'$ groups and COOX groups, wherein $R'$ is selected from the group consisting of $C_1$–$C_{30}$ straight, branched chain and cyclic alkyl or aryl groups and X is selected from the group consisting of H, the alkali metals, $NH_4$ and the $C_1$–$C_4$ alkyl ammonium groups, $R_3$ and $R_4$ are individually and respectively selected from the group consisting of H, $C_1$–$C_{30}$ straight, branched chain and cyclic alkyl or aryl groups, $R_5$, $R_6$, $R_{10}$ and $R_{11}$ are individually and respectively selected from the group consisting of H, the alkali metals, $NH_4$ and the $C_1$–$C_4$ alkyl ammonium groups, Y is selected from the group consisting of Fe, Mn, Mg, Zn, Cu, Ni, Co, Mo, V and Ca, and $R_8$ and $R_9$ are individually and respectively selected from the group consisting of nothing (i.e., the groups are non-existent), $CH_2$, $C_2H_4$, and $C_3H_6$, each of said moieties having or being modified to have a total of two COO groups therein.

As can be appreciated, the polymers of the invention can have different sequences of recurring polymeric subunits as defined above (For example, a polymer comprising B and C subunits may include all three forms of B subunit and all three forms of C subunit. However, for reasons of cost and ease of synthesis, the most useful polymers include recurring polymeric subunits made up of B and C moieties. In the case of the polymer made up of B and C moieties, $R_5$, $R_6$, $R_{10}$, and $R_{11}$ are individually and respectively selected from the group consisting of H, the alkali metals, $NH_4$, and the $C_1$–$C_4$ alkyl ammonium groups. This particular polymer is sometimes referred to as a butanedioic methylenesuccinic acid copolymer and can include various salts and derivatives thereof. The most preferred polymers of the invention are composed of recurring polymeric subunits formed of B and C moieties and have the generalized formula Preferred forms of this polymer have $R_5$, $R_6$, $R_{10}$, and $R_{11}$ individually and respectively selected from the group consisting of H, the alkali metals, $NH_4$, and the $C_1$–$C_4$ alkyl ammonium groups. Other preferred forms of this polymer are capable of having a wide range of repeat unit concentrations in the polymer. For example, polymers having varying ratios of B:C (e.g., 10:90, 60:40, 50:50 and even 0:100) are contemplated and embraced by the present invention. Such polymers would be produced by varying monomer amounts in the reaction mixture from which the final product is eventually produced and the B and C type repeating units may be arranged in the polymer backbone in random order or in an alternating pattern.

The polymers of the invention may have a wide variety of molecular weights, ranging for example from 500–5,000,000, depending chiefly upon the desired end use. Additionally, n can range from about 1–10,000 and more preferably from about 1–5,000.

For purposes of the present invention, it is preferred to use dicarboxylic acids, precursors and derivatives thereof for the practice of the invention. For example, terpolymers containing mono and dicarboxylic acids with vinyl esters and vinyl alcohol are contemplated, however, polymers incorporating dicarboxylic acids were unexpectedly found to be significantly more useful for the purposes of this invention. This finding was in contrast to the conventional teachings that mixtures of mono and dicarboxylates were superior in applications previously suggested for mono-carboxylate polymers. Thus, the use of dicarboxylic acid derived polymers for agricultural applications is unprecedented and produced unexpected results. It is understood that when dicarboxylic acids are mentioned herein, various precursors and derivatives of such are contemplated and well within the scope of the present invention. Put another way, copolymers of the present are made up of monomers bearing at least two carboxylic groups or precursors and/or derivatives thereof. The polymers of the invention may have a wide variety of molecular weights, ranging for example from 500–5,000,000, more preferably from about 1,500–20,000, depending chiefly upon the desired end use.

In many applications, and especially for agricultural uses, the polymers of the invention may be mixed with or complexed with a metal or non-metal ion, and especially ions selected from the group consisting of Fe, Mn, Mg, Zn, Cu, Ni, Co, Mo, V, Cr, Si, B, and Ca. Alternatively, polymers containing, mixed with or complexed with such elements may be formulated using a wide variety of methods that are well known in the art of fertilizer formulation. Examples of such alternative methods include, forming an aqueous solution containing molybdate and the sodium salt of polymers in accordance with the invention, forming an aqueous solution which contains a zinc complex of polymers in accordance with the present invention and sodium molybdate, and combinations of such methods. In these examples, the presence of the polymer in soil adjacent growing plants would be expected to enhance the availability of these elements to these growing plants. In the case of Si and B, the element would merely be mixed with the polymer rather than having a coordinate metal complex formation. However, in these cases, the availability of these ions would be increased for uptake by growing plants and will be termed "complexed" for purposes of this application.

The polymers hereof (with or without complexed ions) may be used directly as plant growth enhancers. For example, such polymers may be dispersed in a liquid aqueous medium and applied foliarly to plant leaves or applied to the earth adjacent growing plants. It has been found that the polymers increase the plant's uptake of both polymer-borne metal nutrients and ambient non-polymer nutrients found in adjacent soil. In such uses, plant growth-enhancing amounts of compositions comprising the above-defined polymers are employed, either in liquid dispersions or in dried, granular form. Thus, application of polymer alone results in improved plant growth characteristics, presumably by increasing the availability of naturally occurring ambient nutrients. Typically, the polymers are applied at a level of from about 0.001 to about 100 lbs. polymer per acre of growing plants, and more preferably from about 0.005 to about 50 lbs. polymer per acre, and still more preferably from about 0.01 to about 2 lbs.

In other preferred uses, the polymers may be used to form composite products where the polymers are in intimate contact with fertilizer products including but not limited to phosphate-based fertilizers such as monoammonium phosphate (MAP), diammonium phosphate (DAP), any one of a number of well known N—P—K fertilizer products, and/or fertilizers containing nitrogen materials such as ammonia (anhydrous or aqueous), ammonium nitrate, ammonium sulfate, urea, ammonium phosphates, sodium nitrate, calcium nitrate, potassium nitrate, nitrate of soda, urea formaldehyde, metal (e.g. zinc, iron) ammonium phosphates; phosphorous materials such as calcium phosphates (normal phosphate and super phosphate), ammonium phosphate, ammoniated super phosphate, phosphoric acid, superphosphoric acid, basic slag, rock phosphate, colloidal phosphate, bone phosphate; potassium materials such as potassium chloride, potassium sulfate, potassium nitrate, potassium phosphate, potassium hydroxide, potassium carbonate; calcium materials, such as calcium sulfate, calcium carbonate, calcium nitrate; magnesium materials, such as magnesium carbonate, magnesium oxide, magnesium sulfate, magnesium, hydroxide; sulfur materials such as ammonium sulfate, sulfates of other fertilizers discussed herein, ammonium thiosulfate, elemental sulfur (either alone or included with or coated on other fertilizers); micronutrients such as Zn, Mn, Cu, Fe, and other micronutrients discussed herein; oxides, sulfates, chlorides, and chelates of such micronutrients (e.g., zinc oxide, zinc sulfate and zinc chloride); such chelates sequestered onto other carriers such as EDTA; boron materials such as boric acid, sodium borate or calcium borate; and molybdenum materials such as sodium molybdate. As known in the art, these fertilizer products can exist as dry powders/granules or as water solutions.

In such contexts, the polymers may be co-ground with the fertilizer products, applied as a surface coating to the fertilizer products, or otherwise thoroughly mixed with the fertilizer products. Preferably, in such combined fertilizer/polymer compositions, the fertilizer is in the form of particles having an average diameter of from about powder size (less than about 0.001 cm) to about 10 cm, more preferably from about 0.1 cm to about 2 cm, and still more preferably from about 0.15 cm to about 0.3 cm. The polymer is present in such combined products at a level of from about 0.001 g to about 20 g polymer per 100 g phosphate-based fertilizer, more preferably from about 0.1 g to about 10 g polymer per 100 g phosphate-based fertilizer, and still more preferably from about 0.5 g to about 2 g polymer per 100 g phosphate-based fertilizer. Again, the polymeric fraction of such combined products may include the polymers defined above, or such polymers complexed with the aforementioned ions. In the case of the combined fertilizer/polymer products, the combined product is applied at a level so that the polymer fraction is applied at a level of from about 0.001 to about 20 lbs. polymer per acre of growing plants, more preferably from about 0.01 to about 10 lbs polymer per acre of growing plants, and still more preferably from about 0.5 to about 2 lbs polymer per acre of growing plants. The combined products can likewise be applied as liquid dispersions or as drygranulated products, at the discretion of the user. When polymers in accordance with the present invention are used as a coating, the polymer comprises between about 0.005% and about 15% by weight of the coated fertilizer product, more preferably the polymer comprises between about 0.01% and about 10% by weight of the coated fertilizer product, and most preferably between 0.5% and about 1% by weight of the coated fertilizer product. It has been found that polymer-coated fertilizer products obtain highly desirable characteristics due to the alteration of mechanical and physical properties of the fertilizer.

Additionally, use of polymers in accordance with the present invention increases the availability of phosphorus and other common fertilizer ingredients and decreases nitrogen volatilization, thereby rendering ambient levels of such plant nutrient available for uptake by growing plants. In such cases, the polymer can be applied as a coating to fertilizer products prior to their introduction into the soil. In turn, plants grown in soil containing such polymers exhibit enhanced growth characteristics.

Another alternative use of polymers in accordance with the present invention includes using the polymer as a seed coating. In such cases, the polymer comprises at least about 0.005% and about 15% by weight of the coated seed, more preferably, the polymer comprises between about 0.01% and about 10% by weight of the coated seed, and most preferably between 0.5% and about 1% by weight of the coated seed. Use of the polymer as a seed coating provides polymer in close proximity to the seed when planted so that the polymer can exert its beneficial effects in the environment where it is most needed. That is to say that the polymer provides an environment conducive to enhanced plant growth in the area where the effects can be localized around the desired plant. In the case of seeds, the polymer coating provides an enhanced opportunity for seed germination and subsequent plant growth due to the decrease in nitrogen volatilization an increase in plant nutrient availability which is provided by the polymer.

In general, the polymers of the invention are made by free radical polymerization serving to convert selected monomers into the desired polymers with recurring polymeric subunits. Such polymers may be further modified to impart particular structures and/or properties. A variety of techniques can be used for generating free radicals, such as addition of peroxides, hydroperoxides, azo initiators, persulfates, percarbonates, per-acid, charge transfer complexes, irradiation (e.g., UV, electron beam, X-ray, gamma-radiation and other ionizing radiation types), and combinations of these techniques. Of course, an extensive variety of methods and techniques are well known in the art of polymer chemistry for initiating free-radical polymerizations. Those enumerated herein are but some of the more frequently used methods and techniques. Any suitable technique for performing free-radical polymerization is likely to be useful for the purposes of practicing the present invention.

The polymerization reactions are carried out in a compatible solvent system, namely a system which does not unduly interfere with the desired polymerization, using essentially any desired monomer concentrations. A number of suitable aqueous or non-aqueous solvent systems can be employed, such as ketones, alcohols, esters, ethers, aromatic solvents, water and mixtures thereof. Water alone and the lower ($C_1$–$C_4$) ketones and alcohols are especially preferred, and these may be mixed with water if desired. In some instances, the polymerization reactions are carried out with the substantial exclusion of oxygen, and most usually under an inert gas such as nitrogen or argon. There is no particular criticality in the type of equipment used in the synthesis of the polymers, i.e., stirred tank reactors, continuous stirred tank reactors, plug flow reactors, tube reactors and any combination of the foregoing arranged in series may be employed. A wide range of suitable reaction arrangements are well known to the art of polymerization.

In general, the initial polymerization step is carried out at a temperature of from about 0° C. to about 120° C. (more preferably from about 30° C. to about 95° C. for a period of from about 0.25 hours to about 24 hours and even more preferably from about 0.25 hours to about 5 hours). Usually, the reaction is carried out with continuous stirring.

Thereafter, the completed polymer may be recovered as a liquid dispersion or dried to a solid form. Additionally, in many cases it is preferred to react the polymer with an ion such as Fe, Mn, Mg, Zn, Cu, Ni, Co, Mo, V, Cr, and Ca to form a coordinate metal complex. Techniques for making metal-containing polymer compounds are well known to those skilled in the art. In some of these techniques, a metal's oxide, hydroxide, carbonate, salt, or other similar compound may be reacted with the polymer in acid form. These techniques also include reacting a finely divided free metal with a solution of an acid form of a polymer described or suggested herein. Additionally, the structures of complexes or salts of polymers with metals in general, and transition metals in particular, can be highly variable and difficult to precisely define. Thus, the depictions used herein are for illustrative purposes only and it is contemplated that desired metals or mixtures of such are bonded to the polymer backbone by chemical bonds. Alternatively, the metal may be bonded to other atoms in addition to those shown. For example, in the case of the structure shown herein for the second reactant, there may be additional atoms or functional groups bonded to the Y. These atoms include, but are not limited to, oxygen, sulfur, halogens, etc. and potential functional groups include (but are not limited to) sulfate, hydroxide, etc. It is understood by those skilled in the art of coordination compound chemistry that a broad range of may be formed depending upon the preparation protocol, the identity of the metal, the metal's oxidation state, the starting materials, etc. In the case of Si and B ions, the polymer is merely mixed with these ions and does not form a coordinate complex. However, the availability of these ions to growing plants is increased. It is also noted that it is possible to react the monomers used to form the polymer with ions in similar ways before polymerization. In other words, the monomers can be reacted with metals (including metals in their pure state, as oxides, carbonates, hydroxides, or other suitable metal-containing compounds) or ions in such a way as to result in the formation of a salt, a complex, or a similar molecule. It is also contemplated that reaction of monomers with a metal can be followed by their polymerization and subsequent reaction with a further portion of metal.

In more detail, the preferred method for polymer synthesis comprises the steps of providing a reaction mixture comprising at least two different reactants selected from the group consisting of first and second reactants. The first reactant is of the general formula

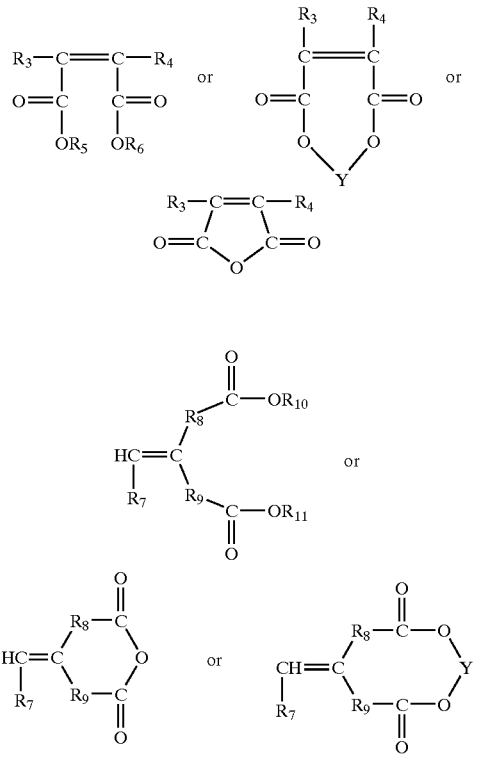

With reference to the above formulae, each $R_7$ is individually and respectively selected from the group consisting of H, OH, $C_1$–$C_{30}$ straight, branched chain and cyclic alkyl or aryl groups, $C_1$–$C_{30}$ straight, branched chain and cyclic alkyl or aryl formate ($C_0$), acetate ($C_1$), propionate ($C_2$), butyrate ($C_3$), etc. up to $C_{30}$ based ester groups, R'$CO_2$ groups, OR' groups and COOX groups, wherein R' is selected from the group consisting of $C_1$–$C_{30}$ straight, branched chain and cyclic alkyl or aryl groups and X is selected from the group consisting of H, the alkali metals, $NH_4$ and the $C_1$–$C_4$ alkyl ammonium groups, $R_3$ and $R_4$ are individually and respectively selected from the group consisting of H, $C_1$–$C_{30}$ straight, branched chain and cyclic alkyl or aryl groups, $R_5$, $R_6$, $R_{10}$ and $R_{11}$ are individually and respectively selected from the group consisting of H, the alkali metals, $NH_4$ and the $C_1$–$C_4$ alkyl ammonium groups, Y is selected from the group consisting of Fe, Mn, Mg, Zn, Cu, Ni, Co, Mo, V and Ca, and $R_8$ and $R_9$ are individually and respectively selected from the group consisting of nothing (i.e., the groups are non-existent), $CH_2$, $C_2H_4$, and $C_3H_6$, each of said moieties having or being modified to have a total of two COO groups therein.

Selected monomers and reactants are dispersed in a suitable solvent system and placed in a reactor. The polymerization reaction is then carried out to obtain an initial polymerized product having the described recurring polymeric subunits. Put another way, the general reaction proceeds by dissolving monomers (e.g., maleic anhydride and itaconic acid) in acetone and/or water in either equimolar or non-equimolar amounts. A free radical initiator is then introduced and copolymerization takes place in solution. After the reaction is complete and a major fraction of the monomer has been reacted, the resulting solution for this particular example is a maleic acid-itaconic acid copolymer. Of course, if all monomers have not undergone polymerization, the resulting solution will contain a small portion of monomers which do not affect later use of the polymer.

Another important aspect of the present invention is the enhancement of dust control when a polymer in accordance with the present is applied as a coating to a fertilizer. It has been found that coating the fertilizer with a polymer in accordance with the present invention greatly decreases the generation of dust. Such a dust-controlling property of polymers in accordance with the present invention was entirely unexpected yet provides a distinct advance in the state of the art in that, typically, a separate dust-controlling substance is applied to fertilizers prior to their application in a field. Generally, the polymer will be applied as a coating to the surface of the fertilizer in order to form a substantially coated fertilizer product. As noted above, the polymer may comprise between about 0.005% to about 15% by weight of the coated fertilizer product, however, for dust control, it is preferred to have the coating level be up to about 0.5% w/w as it has been demonstrated that coating levels as low as 0.5% w/w completely inhibit the generation of dust. Of course, the coating level can be increased to levels greater than 0.5% w/w in order to enhance other beneficial properties of the polymer while still completely inhibiting dust generation. Thus, the present invention will eliminate the need for this separate dust-controlling substance while still contributing all of the beneficial properties described above.

Again, it is important to note that the aforementioned methods and procedures are merely preferred methods of practicing the present invention and those skilled in the art understand that a large number of variations and broadly analogous procedures can be carried out using the teachings contained herein. For example, polymers may be used as is (in the acid form) or further reacted with various materials to make salts and/or complexes. Furthermore, complexes or salts with various metals may be formed by reacting the acid form with various oxides, hydroxides, carbonates, and free metals under suitable conditions. Such reactions are well known in the art and include (but are not limited to) various techniques of reagent mixing, monomer and/or solvent feed, etc. One possible technique would be gradual or stepwise addition of an initiator to a reaction in progress. Other potential techniques include the addition of chain transfer agents, free radical initiator activators, molecular weight moderators/control agents, use of multiple initiators, initiator quenchers, inhibitors, etc. Of course, this list is not comprehensive but merely serves to demonstrate that there are a wide variety of techniques available to those skilled in the art and that all such techniques are embraced by the present invention.

DETAILED DESCRIPTION

Figure 1:
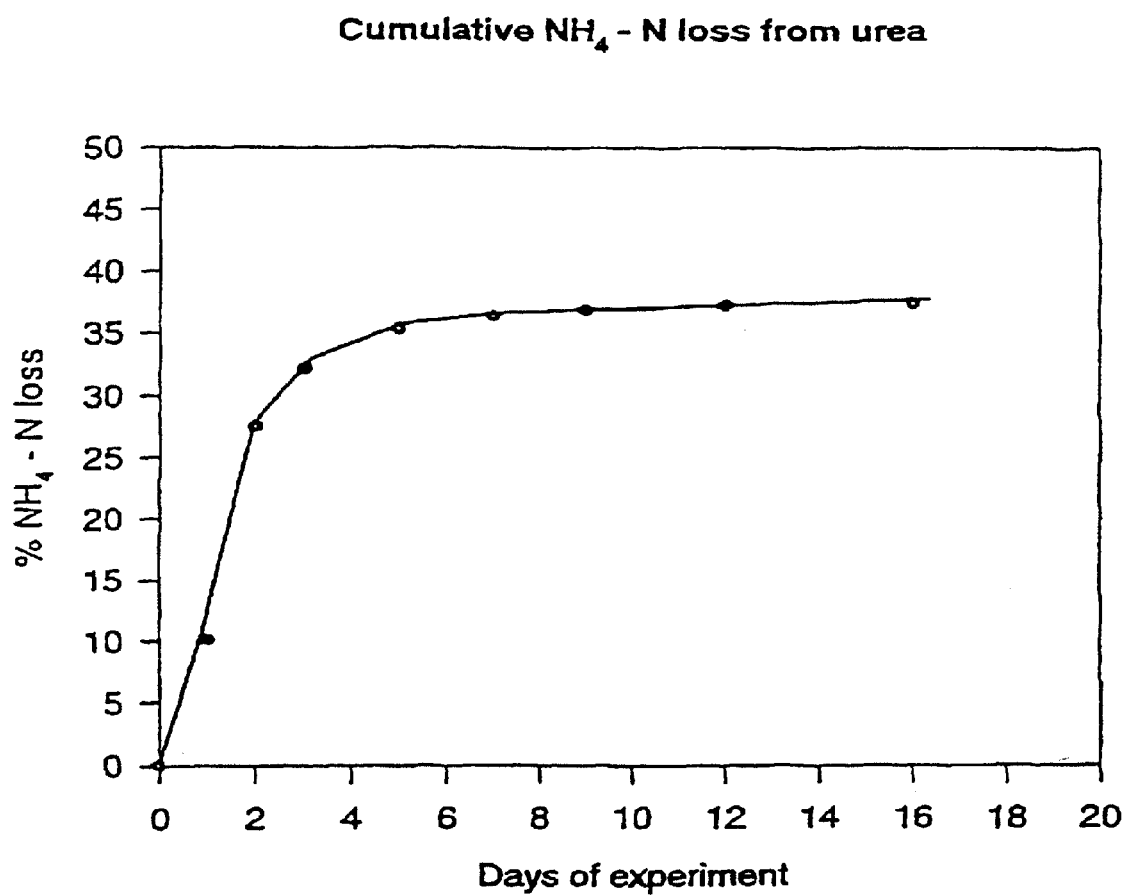
FIG. 1 is a graph illustrating the percentage of nitrogen and ammonia lost from untreated urea over a sixteen day testing period.

The following examples set forth techniques for the synthesis of polymers in accordance with the invention, and various uses thereof. It is to be understood that these examples are provided by way of illustration only and nothing therein should be taken as a limitation upon the overall scope of the invention.

EXAMPLE 1

Acetone (803 g), maleic anhydride (140 g), itaconic acid (185 g) and benzoyl peroxide (11 g) were stirred together under inert gas in a reactor. The reactor provided included a suitably sized cylindrical jacketed glass reactor with mechanical agitator, a contents temperature measurement device in contact with the contents of the reactor, an inert gas inlet, and a removable reflux condenser. This mixture was heated by circulating heated oil in the reactor jacket and stirred vigorously at an internal temperature of about 65–70Å° C. This reaction was carried out over a period of about 5 hours. At this point, the contents of the reaction vessel were poured into 300 g water with vigorous mixing. This gave a clear solution. The solution was subjected to distillation at reduced pressure to drive off excess solvent and water. After sufficient solvent and water have been removed, the solid product of the reaction precipitates from the concentrated solution, and is recovered. The solids are subsequently dried in vacuo. A schematic representation of this reaction is shown below.

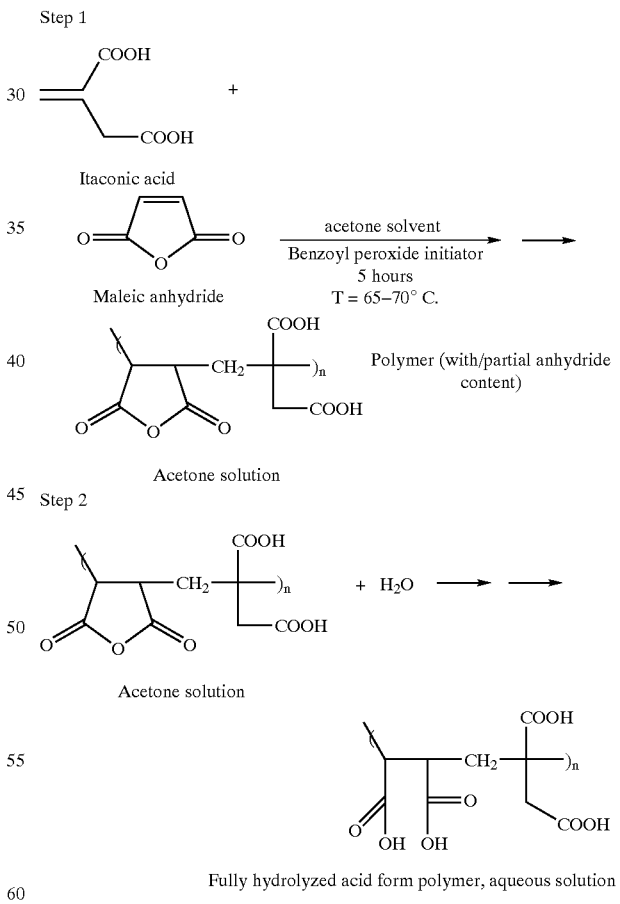

EXAMPLE 2

This reaction was carried out in equipment similar to that used in Example 1 above. The following procedure was followed: 847 g purified water was placed into the reactor. Next, 172 g itaconic acid and 130 g maleic anhydride were added with vigorous stirring. This mixture was heated to about 85–90° C., at which temperature this mixture exists as a clear solution. When the mixture reached the desired temperature, 15 g of potassium persulfate was added to the solution. The reaction mixture was allowed to stir for 3 hours, and a second portion of persulfate, equal to the first, was added, and allowed to react for a further 3 hours. Product was isolated in the same manner as described for Example 1. A schematic representation of this reaction is shown below Step 1

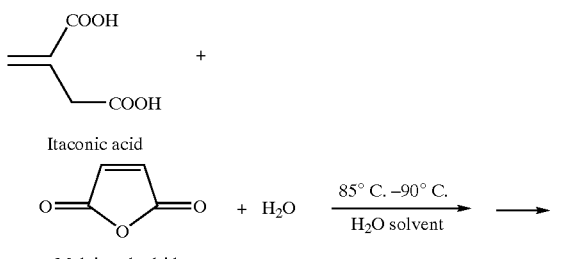

Step 2

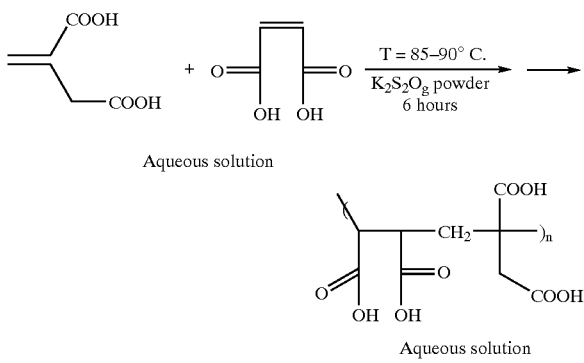

EXAMPLE 3

The procedure of Example 2 was followed, but the product was not isolated. Instead, it was diluted with water to give a 10% w/w solution. Then, 6.62 g ZnO was added to 200 g of this solution. The oxide dissolved in the liquid with stirring. This solution was then dried to a white highly water-soluble powder.

EXAMPLE 4

The procedure of Example 2 was followed, but the product was not isolated. Instead, it was diluted with water to give a 30% w/w solution. 6.66 g CuO was then added to 260 g of this solution. The oxide dissolved in the liquid with stirring and heating to about 60 degrees C. This solution was then dried to a green-colored highly water-soluble powder.

EXAMPLE 5

The procedure of Example 2 was followed, but the product was not isolated. Instead, it was diluted with water to give a 10% w/w solution. To 200 g of this solution, 5.76 g $MnO_2$ was added. The oxide dissolved in the liquid with stirring and heating to about 60 degrees C. This solution was then dried to a pink-colored, highly water-soluble powder.

EXAMPLE 6

The procedure of Example 2 was followed, but the product was not isolated. Instead, it was diluted with water to give a 10% w/w solution. Next, 3.28 g MgO was added to 200 g of this solution. The oxide dissolved in the liquid with stirring. This solution was then dried to a white highly water-soluble powder.

EXAMPLE 7

The procedure of Example 2 was followed, but the product was not isolated. Instead, it was diluted with water to give a 25% w/w solution. 2.96 g $V_2O_5$ was then added to 240 g of this solution. The oxide dissolved in the liquid with stirring. This solution was then dried to a green highly water-soluble powder.

EXAMPLE 8

The procedure of Example 2 was followed, but the product was not isolated. Instead, it was diluted with water to give a 10% w/w solution. To 200 g of this solution, 3.03 g metallic Fe in finely powdered form was added. The metal dissolved in the liquid with stirring. This solution was then dried to a yellow highly water-soluble powder.

EXAMPLE 9

The procedure of Example 2 was followed, but the product was not isolated. Instead, it was diluted with water to give a 10% w/w solution. To 200 g of this solution, 8.14 g $CaCO_3$ was added. The carbonate dissolved in the liquid with stirring. This solution was then dried to a white highly water-soluble powder.

EXAMPLE 10

The procedure of Example 2 was followed, but the product was not isolated. Instead, it was neutralized to a pH of 7 with aqueous NaOH (40% w/w). The resulting solution was dried to give a white highly water-soluble powder.

EXAMPLE 11

The procedure of Example 2 was followed, but the product was not isolated. Instead, it was neutralized to a pH of 7 with aqueous KOH (30% w/w). The resulting solution was dried to give a white highly water-soluble powder.

EXAMPLE 12

The procedure of Example 2 was followed, but the product was not isolated. Instead, it was neutralized to a pH of 3 with anhydrous ammonia gas that was introduced into the solution by means of a gas dispersion tube. The resulting solution was dried to give a white highly water-soluble powder.

EXAMPLE 13

This example followed the procedure of Example 12. However, the anhydrous ammonia gas was introduced into the solution prior to the addition of the initiator. Again, the solution was neutralized to a pH of 3. Thus, the neutralization step partially neutralized the monomers rather than the polymer. The initiator used for this example was ammonium persulfate and the reaction scheme is depicted below.

In this scheme, the first three steps are just an extensive elaboration of the neutralization of the water-monomer mixture with anhydrous ammonia to a pH of 3. Such a reaction is equally describable by depicting a reaction scheme using starting materials including itaconic acid, maleic anhydride, anhydrous ammonia, and water which results in the product shown at the far right end in step 3. The salts as drawn are theoretical, however, this does show that the monomers are not completely neutralized nor are they completely un-neutralized. Of course, it is well within the scope of the present invention to have the monomers completely neutralized or completely un-neutralized by the addition of any suitable base as well as having a wide range of B:C monomer ratios.

lp;2p
Step 1

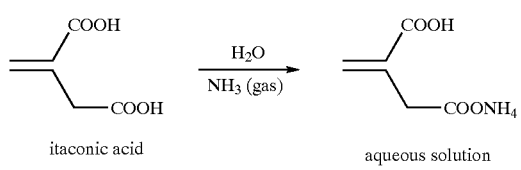

Step 2

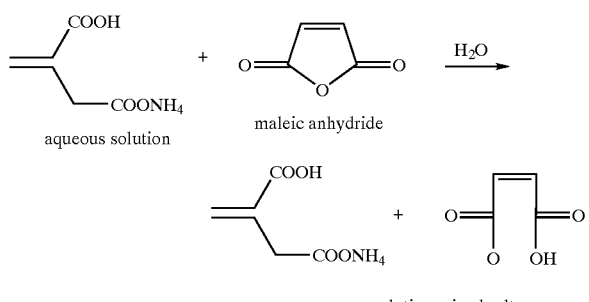

Step 3

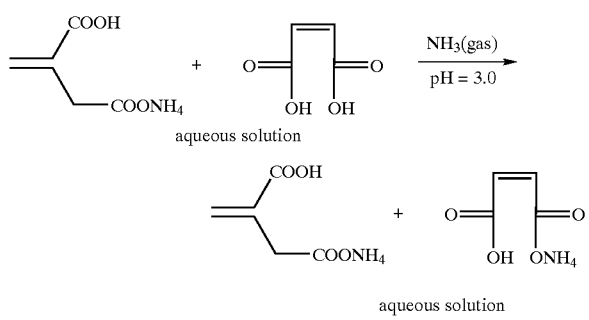

Step 4

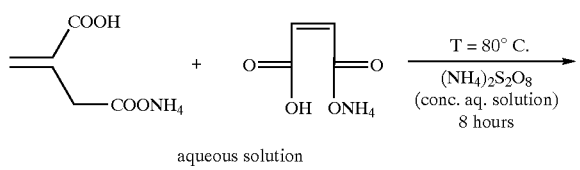

-continued

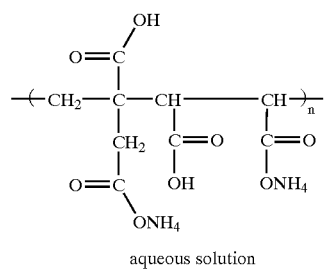

aqueous solution

EXAMPLE 14

This reaction was carried out in equipment similar to that used in Example 1 above. The following procedure was followed:1990 g purified water was placed into the reactor and 1260 g itaconic acid and 950 g maleic anhydride was added with vigorous stirring. This mixture was then heated to about 75 C, at which temperature this mixture as a clear solution. When the mixture reached the desired temperature, 270 g potassium persulfate was added stepwise to the solution. Persulfate addition was conducted at 1 hour intervals in amount of 30 g per addition. Product was isolated in the same manner as described in Example 1.

EXAMPLE 15

This reaction was carried out in the same fashion as Example 14, but ammonium persulfate was used. The total amount of persulfate was 225 g.

EXAMPLE 16

In this example, the effect of polymer upon volatilization of ammonia from urea was determined. A 100 g sample of granular urea was coated with the H polymer by adding 1% polymer and 3.5 ml liquid ($H_2O$) to the urea and shaking the mixture to achieve a uniform coating on the urea. Clay (kaolanite clay) was then added to absorb the excess $H_2O$. Polymer coated urea and uncoated urea were placed in chambers that were optimized for the volatilization of ammonia. The polymer coated urea and uncoated urea were then analyzed for content over a sixteen day period.

Figure 2:
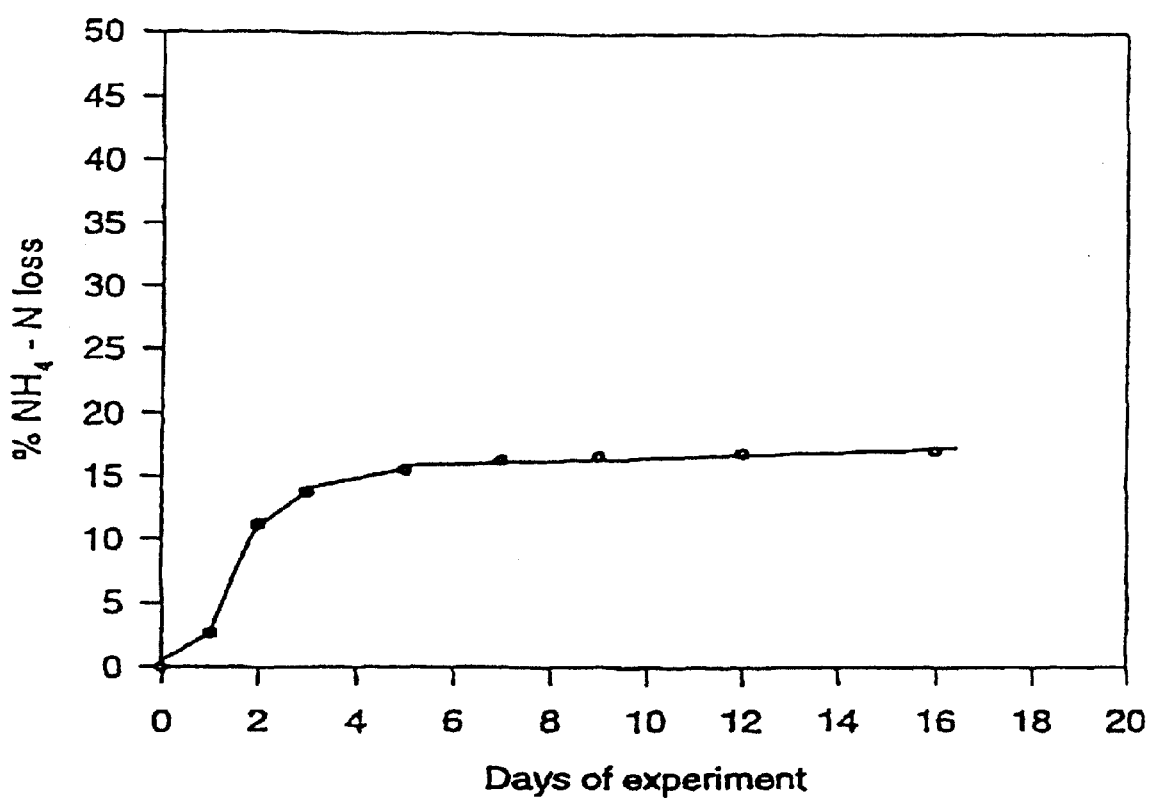
FIG. 2 is a graph illustrating the percentage of nitrogen and ammonia lost over a sixteen day testing period from urea coated with polymer.

FIG. 1 illustrates the amount of nitrogen and ammonia lost from the urea over the sixteen day testing period. This loss totaled 37.4%. In comparison, FIG. 2 illustrates the amount of ammonia and nitrogen lost from the urea coated with the polymer. The polymer coated urea experienced a 54% reduction of nitrogen and ammonia loss in comparison to the uncoated urea. Thus, the polymer coating greatly decreased nitrogen volatilization. Such a decrease in volatilization would also result from the polymer and urea being co-ground together or by having the polymer in close proximity to the urea in soil.

EXAMPLE 17

In this example the effects of liquid ammoniated phosphates and polymer-treated liquid ammoniated phosphates on acid soils having a high phosphorous fixation capacity period were compared. Untreated liquid ammoniated phosphate (10-34-0) and liquid ammoniated phosphate with 1% by weight polymer and liquid ammoniated phosphate with 2% by weight ammoniated polymer were applied in a band (2 inches below and 2 inches beneath) in the seed row. The polymer used for this experiment was the sodium form. Corn was grown to the six leaf stage and then harvested. The plants were dried, and the dry weight recorded. Results of this experiment are given in Table 1.

The acid soil was very responsive to the 10-34-0 controlled and corn grown in this soil experienced a 151% increase in dry weight. In comparison, the addition of 1% polymer increased corn growth by an additional 19% and addition of the 2% polymer increased corn growth by 26% in comparison to the 10-34-0 control. Thus, addition of the polymer had advantageous effects on the growth of corn

TABLE 1

| Acid Soil | Dry Matter/grams |
|---|---|
| No P Control | 1.67 |
| 10-34-0 Control (No Polymer) | 4.20 |
| 10-34-0 1% Polymer | 5.00 |
| 10-34-0 2% Polymer | 5.30 |

EXAMPLE 18

In this example the efficiency of different salts of the anionic polymer as a coating on phosphate fertilizer was evaluated. Polymer coatings were applied on a 1% by weight basis onto MAP. The test crop for this experiment was corn and the polymer used was a polymer formed by B and C monomers. All phosphorous treatments were banded 2 inches below and 2 inches away from the seed rows. The acid in calcareous soils used in this experiment are both known to fix phosphorous fertilizer, thereby limiting the growth of crops. The corn was harvested at the six leaf stage and dry weights were determined as an indication as the efficiency of the coatings on phosphorous uptake and resultant corn growth. Results of this experiment are given below in Table 2. Table 2 shows that both the hydrogen and ammonium salts of the polymer were effective at increasing corn growth when combined with MAP. The acid control (untreated MAP) produced 294% more dry matter than the control which did not include MAP. These results illustrate that the soil is very responsive to phosphorous. When the MAP was coated with the anionic polymer charged neutralized with hydrogen, dry matter yields were increased by 41.9%. The calcareous control (untreated MAP) produced 128% more dry matter than the control which did not include any MAP. The MAP treated with the anionic polymer charge neutralized with ammonium, produced 15.9% more dry matter than the MAP control

TABLE 2

| | Acid Soil (Dry Matter/grams) | Calcareous Soil (Dry Matter/grams) |
|---|---|---|
| No P Control (no MAP) | 4.72 | 12.4 |
| MAP Control | 18.6 | 28.3 |
| 1% Hydrogen Polymer | 26.4 | |
| 1% Ammonium Polymer | | 32.81 |

EXAMPLE 19

In this example, the effect of a zinc polymer on corn seedling growth was determined. A 21% zinc-polymer was prepared and applied to corn seeds at a rate of eight ounces per 100 pounds of seed. The seeds, were planted in six inch pots and allowed to grow until they reached the four leaf stage. The soil was calcareous and had low zinc availability. At the four leaf stage, plants were harvested and dried, then the dry weights were determined. Dry weights increased by 29% on the plants where the zinc-polymer was applied to the seed versus the control.

EXAMPLE 20

This example tested the dust controlling effects of the polymer on fertilizer particles. The test used was an abrasion resistance test based on the rotary drum method. This tests the resistance to dust and fines formation resulting from granule-granule and granule-equipment contact. It is useful in determining material losses; handling, storage, and application properties; and pollution control equipment requirements. A sample was first screened manually to separate out a fraction containing approximately minus 3.35 mm to 1.00 mm granules. A representative 100 cm$^3$ portion of the minus 3.35- plus 1.00-mm fraction was then used in the test. A 20 g portion of this was then weighed out and placed in a 100 ml rectangular polyethylene bottle together with 10 stainless steel balls measuring 7.9 mm in diameter and having a total weight of 20.0 g. The bottle was then closed and manually shaken for five minutes. In order to ensure uniform shaking for all samples in an analytical run, all sample bottles were taped together into one block. At the end of the run, the balls were removed manually, and the bottle contents examined. Fines were separated manually and weighed. Results from this example are given below in Table 3 which clearly shows that the polymers of the present invention are highly useful as a coating for MAP fertilizer particles in order to enhance abrasion resistance and decrease dust generation. The reference to the "H" polymer form refers to the fact that the carboxylic acid groups are still intact

TABLE 3

| Fertilizer Type | Coating | Coating Level, Percent W/W, As-Is | % Dust after Shaking |
|---|---|---|---|
| Granular MAP | None | N/A | 0.43 |
| Granular MAP | ARR-MAZ KGA500 | 0.52 | 0.29 |
| Granular MAP | High charge polymer, mostly H form, 60% solids | 0.5 | none |
| Granular MAP | High charge polymer, mostly H form, 60% solids | 1 | none |
| Granular MAP | High charge polymer, mostly H form, 60% solids | 1.5 | none |

What is claimed is:

1. A method of forming a substantially water soluble dicarboxylic polymer comprising the steps of:

providing a reaction mixture comprising at least two different reactants selected from the group consisting of first and second reactants, wherein said first reactant is a dicarboxylic reactant of the general formula

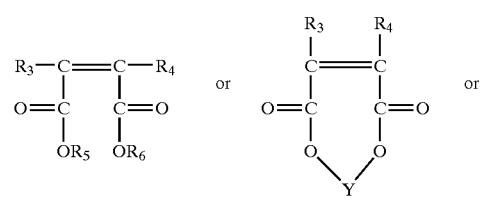

-continued

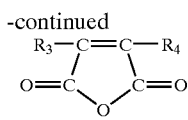

and said second reactant is a dicarboxylic reactant of the general formula

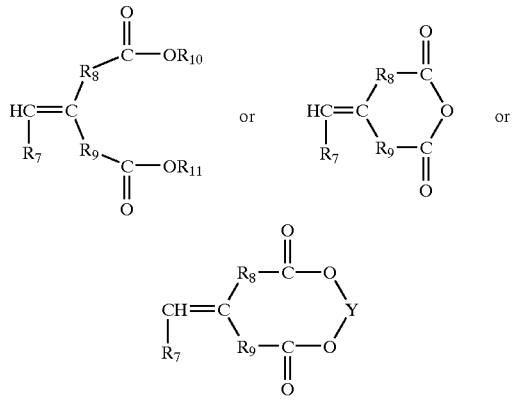

wherein each $R_7$ is individually and respectively selected from the group consisting of H, OH, $C_1$–$C_{30}$ straight, branched chain and cyclic alkyl or aryl groups, $C_1$–$C_{30}$ straight branched chain and cyclic alkyl or aryl based ester groups, $R'CO_2$ groups, $OR'$ groups and COOX groups, wherein R' is selected from the group consisting of $C_1$–$C_{30}$ straight, branched chain and cyclic alkyl or aryl groups and X is selected from the group consisting of H, the alkali metals, $NH_4$ and the $C_1$–$C_{30}$ alkyl ammonium groups, $R_3$ and $R_4$ are individually and respectively selected from the group consisting of H, $C_1$–$C_{30}$ straight, branched chain and cyclic alkyl or aryl groups, $R_5$, $R_6$, $R_{10}$ and $R_{11}$ are individually and respectively selected from the group consisting of H, the alkali metals, $NH_4$ and the $C_1$–$C_{30}$ alkyl ammonium groups, Y is selected from the group consisting of Fe, Mn, Mg, Zn, Cu, Ni, Co, Mo, V and Ca, and $R_8$ and $R_9$ are individually and respectively selected from the group consisting of nothing (i.e., the groups are non-existent), $CH_2$, $C_2H_4$, and $C_3H_6$, each of said moieties having or being modified to have a total of two COO groups therein, all of the moieties making up the reaction mixture being dicarboxylic moieties; and polymerizing said reaction mixture to form a polymer having polymeric subunits therein with carboxyl-containing groups.

2. The method of claim 1, said first reactant being maleic anhydride and said second reactant being itaconic acid.

3. The method of claim 1, said polymerization step being carried out by generating free radicals in said reaction mixture.

4. The method of claim 3, said free radical generation step comprising the step of adding a peroxide to said reaction mixture.

5. The method of claim 3, said free radical generation step comprising the step of subjecting said reaction mixture to UV light.

6. The method of claim 3, said free radical generation step comprising the step of adding a persulfate to said reaction mixture.

7. The method of claim 1, said reaction mixture being formed in a solvent selected from the group consisting of water and acetone.

8. The method of claim 1, said polymerization step being carried out at a temperature of from about 0° C. to about 120° C. for a period of from about 0.25 hours to about 24. hours.

9. The method of claim 1, said polymerization step being carried out under an inert gas atmosphere.

10. The method of claim 1, including the step of drying said polymer to a solid form.

11. The method of claim 1, including the step of reacting said polymer with an ion to form a complex with the polymer.

12. The method of claim 11, said ion being selected from the group consisting of Fe, Zn, Cu, Mn, Mg, Co, Ni, Al, V or Ca ion.

13. The method of claim 1, further including the step of applying said polymer to the surface of a fertilizer particle.

14. The method of claim 1, said polymer application substantially coating said fertilizer particle.

15. The method of claim 1, including the step of reacting at least one of said reactants with an ion to form a complex.

16. The method of claim 15, said ion being selected from the group consisting of Fe, Zn, Cu, Mn, Mg, Co, Ni, Al, V or Ca ion.

17. A method of forming a substantially water soluble dicarboxylic polymer comprising the steps of:

providing a reaction mixture comprising at least two different reactants selected from the group consisting of first and second reactants, wherein said first reactant is a dicarboxylic reactant of the general formula

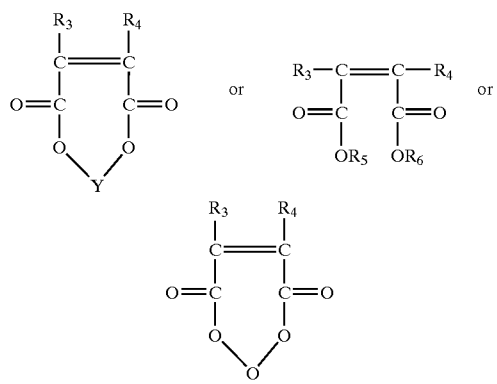

and said second reactant is a dicarboxylic reactant of the general formula

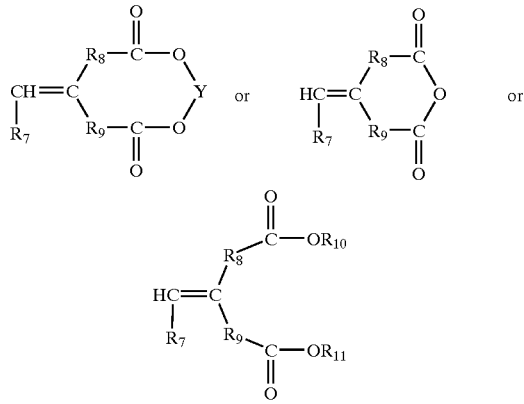

wherein each $R_7$ is individually and respectively selected from the group consisting of H, OH, $C_1$–$C_{30}$ straight, branched chain and cyclic alkyl or aryl groups, $C_1$–$C_{30}$ straight, branched chain and cyclic alkyl or aryl based ester groups, $R'CO_2$ groups, $OR'$ groups and $COOX$ groups, wherein $R'$ is selected from the group consisting of $C_1$–$C_{30}$ straight, branched chain and cyclic alkyl or aryl groups and X is selected from the group consisting of H, the alkali metals, $NH_4$ and the $C_1$–$C_4$ alkyl ammonium groups, $R_3$ and $R_4$ are individually and respectively selected from the group consisting of H, $C_1$–$C_{30}$ straight, branched chain and cyclic alkyl or aryl groups, $R_5$, $R_6$, $R_{10}$ and $R_{11}$ are individually and respectively selected from the group consisting of H, the alkali metals, $NH_4$ and the $C_1$–$C_4$ alkyl ammonium groups, Y is selected from the group consisting of Fe, Mn, Mg, Zn, Cu, Ni, Co, Mo, V and Ca, and $R^8$ and $R_9$ are individually and respectively selected from the group consisting of nothing (i.e., the groups are non-existent), $CH_2$, $C_2H_4$, and $C_3H_6$, each of said moieties having or being modified to have a total of two COO groups therein, all of the moieties making up the reaction mixture being dicarboxylic moieties; and polymerizing said reaction mixture to form a polymer having polymeric subunits therein with carbonyl-containing groups.

18. The method of claim 17, said first reactant being maleic anhydride.

19. The method of claim 17, said polymerization step being carried out by generating free radicals in said reaction mixture.

20. The method of claim 17, said free radical generation step comprising the step of adding a peroxide to said reaction mixture.

21. The method of claim 17, said free radical generation step comprising the step of adding a persulfate to said reaction mixture.

22. The method of claim 17, said free radical generation step comprising the step of subjecting said reaction mixture to UV light.

23. The method of claim 17, said reaction mixture being formed in a solvent selected from the group consisting of water and acetone.

24. The method of claim 17, said polymerization step being carried out at a temperature of from about 0° C. to about 120° C. for a period of from about 0.25 hours to about 24 hours.

25. The method of claim 17, said polymerization step being carried out under an inert gas atmosphere.

26. The method of claim 17, further including the step of drying said polymer to a solid form.

27. The method of claim 17, including the step of reacting said polymer with an ion to form a complex with the polymer.

28. The method of claim 27, said ion being selected from the group consisting of Fe, Zn, Cu, Mn, Mg, Co, Ni, Al, V or Ca ion.

* * * * *